(12) United States Patent
Encinias et al.

(10) Patent No.: US 7,044,011 B2
(45) Date of Patent: May 16, 2006

(54) TEST FIXTURE ASSEMBLY FOR DIRECTIONAL PILOT VALVE AND RELATED METHOD

(75) Inventors: Virginia Kay Encinias, Oxford, AL (US); Michael Walker, Anniston, AL (US); Michael Wayne Sides, Jacksonville, AL (US)

(73) Assignee: Honeywell International, Inc., Morristown, NJ (US)

( * ) Notice: Subject to any disclaimer, the term of this patent is extended or adjusted under 35 U.S.C. 154(b) by 71 days.

(21) Appl. No.: 10/426,617

(22) Filed: Apr. 30, 2003

(65) Prior Publication Data

US 2004/0216511 A1 Nov. 4, 2004

(51) Int. Cl.
*G01N 19/00* (2006.01)

(52) U.S. Cl. ............... 73/865.9; 73/865.9; 137/489; 137/490

(58) Field of Classification Search ........... 73/865.9; 137/489, 490
See application file for complete search history.

(56) References Cited

U.S. PATENT DOCUMENTS

| | | | |
|---|---|---|---|
| 2,565,088 A | 8/1951 | Peterson |
| 3,967,495 A | 7/1976 | Wesner et al. |
| 3,987,817 A | 10/1976 | Peters |
| 4,384,591 A | 5/1983 | Tan |
| 4,390,041 A | 6/1983 | Reip |
| 4,402,341 A | 9/1983 | Reip |
| 4,410,005 A | 10/1983 | Reip |
| 4,480,653 A | 11/1984 | Vanderburg |
| 4,586,533 A | 5/1986 | Estes |
| 4,615,722 A | 10/1986 | Steffan et al. |
| 4,646,556 A | 3/1987 | Courcoux et al. |
| 4,682,495 A | 7/1987 | McNeely |
| 4,770,029 A | 9/1988 | Webber et al. |
| 4,881,571 A | 11/1989 | Reip |
| 4,896,101 A | 1/1990 | Cobb |
| 4,903,529 A | 2/1990 | Hodge |
| 4,957,136 A | 9/1990 | Gavrila |
| 5,113,705 A | 5/1992 | Earnhardt |
| 5,142,906 A | 9/1992 | Smith |
| 5,293,777 A | 3/1994 | Reid et al. |
| 5,544,528 A | 8/1996 | Woyski et al. |
| 5,578,772 A | 11/1996 | Kadis |
| 5,590,684 A | 1/1997 | Alberts et al. |
| 5,665,898 A | 9/1997 | Smith et al. |
| 5,769,113 A | 6/1998 | Alberts et al. |
| 5,842,501 A | 12/1998 | Powell et al. |
| 5,880,358 A | 3/1999 | Emmitte, Jr. |
| 6,131,609 A | 10/2000 | Metso et al. |
| 6,422,259 B1 | 7/2002 | Moreno |

FOREIGN PATENT DOCUMENTS

| | | |
|---|---|---|
| GB | 2 197 490 A | 5/1988 |
| JP | 2003166801 A * | 6/2003 |
| WO | WO 97/44645 | 11/1997 |
| WO | PCT/US2004/013329 | 3/2005 |

* cited by examiner

*Primary Examiner*—Hezron Williams
*Assistant Examiner*—John Fitzgerald
(74) *Attorney, Agent, or Firm*—Ingrassia Fisher & Lorenz

(57) ABSTRACT

A test fixture for testing directional pilot valves as used in connection with turbine engine thrust reversers, and an associated method of use. In a particular embodiment, the test fixture has a base and at least one support mounted to the base to support the directional pilot valve. At least one fastener permits attachment of the directional pilot valve to the support. An adjustable actuator is also mounted to the base and is capable of stroking the directional pilot valve to simulate valve positions that may be encountered in operation of the valve. The adjustable actuator is also capable of maintaining a force, as set by a technician, against the directional pilot valve.

24 Claims, 4 Drawing Sheets

TEST FIXTURE ASSEMBLY FOR DIRECTIONAL PILOT VALVE AND RELATED METHOD

FIELD OF THE INVENTION

This invention relates generally to pilot valves for use in aircraft or gas turbine engine applications, and in particular to an apparatus and related method for testing aircraft pilot valves that can be used in connection with turbine engine thrust reversers.

BACKGROUND OF THE INVENTION

Directional air flow pilot valves may serve a variety of useful purposes in connection with a gas turbine aircraft turbine engine, such as to control the engaging and disengaging of an aircraft engine's thrust reverser. In general, aircraft turbine engine thrust is directed towards the rear of the plane. Upon landing, in an effort to diminish lift as well as slow the aircraft, the direction of thrust may partially be reversed with the use of a thrust reverser. The developer of the present inventions, Honeywell International, Inc., has for years successfully designed, developed, and manufactured turbine engines that have directional pilot valves used in connection with thrust reversers.

Aircraft air flow pilot valves are generally known and reliable devices used in the operation of aircraft control systems. Directional air flow pilot valves are valves that permit air flow in a specific direction. One type, known as a directional pilot valve (DPV), has a sealing rod assembly, which is moved along the longitudinal axis of the DPV in and out of the valve housing assembly. Actuated movement of the sealing rod assembly is commonly referred to as stroking. The outer limit of movement is commonly known as maximum stroke length. Generally speaking, the flow rate of air through the DPV will change as the stroke of the valve is increased or decreased, because the valve is opened and/or closed by the linear motion of the sealing rod.

Proper calibration of the DPV helps to ensure proper operation of the thrust reverser. As initially manufactured, a DPV will operate to control passage of air through the valve assembly at a known rate. Over time, due to internal wear, debris and foreign matter which may enter the valve unintentionally, and other factors, the flow rate of the directional valve may significantly change. Such a change in flow rate may result in the operation of the DPV outside of the desired calibration range. However, as flight control systems are redundant, conventional gas turbine engines and thrust reversers are operationally safe and reliable despite the foregoing variations in calibration of a DPV.

In operation, a DPV may have two general forces acting upon it—the first is a constant physical load force applied against the opening of the valve and the second is an air pressure force applied in a direction opposite to the physical load force. To test a DPV for proper calibration, it is desirable to therefore apply forces in an opposing manner to simulate the valve's operational response. To calibrate the valve, these forces are applied in a known and controlled fashion while the stroke of the valve is varied. In general, such a calibration test can measure the effective air pressure and leakage when the DPV is in a seated position, as in closed, and the volume of air flow when the DPV is in an open position.

At present, a technician performing a calibration measurement test upon a DPV attempts to physically hold, apply force and measure pressure and flow rate—a physically demanding and complex process that may result in inaccurate measurement. If a DPV cannot be properly calibrated, the entire DPV is replaced with a new valve or remanufactured to original specifications to ensure proper operation.

The replacement with a new valve is wasteful of resources and costly. The one alternative is to remanufacture the valve. However, remanufacturing is a complex process involving specialized tooling, training and a time-consuming assembly and test processes. With either replacement or remanufacture, the flow rate calibration is based upon the design specification and not the actual flow rates of the given valve. Thus, even with new replacement or remanufacture there is a possibility of a calibration that is inaccurate to some degree Hence, there is a need for an improved DPV calibration system with improved characteristics to overcome one or more of the drawbacks identified above. The present invention satisfies one or more of these needs.

SUMMARY OF THE INVENTION

This invention provides an improved apparatus and related method for testing aircraft directional pilot valves used in connection with thrust reversers.

In particular, and by way of example only, one embodiment of the present invention provides a test fixture assembly for testing a general aviation directional pilot valve having a housing assembly, an inlet, and an opposing actuating sealing rod assembly. The test fixture assembly provides a supporting means for supporting the housing assembly and an attaching means for attaching the housing assembly to the supporting means. Also provided is an actuating means for actuating the sealing rod assembly within the supported housing assembly. In addition, the test fixture provides a binding means for binding the actuating means so that the sealing rod assembly is held at a specific point of actuation.

Moreover, according to an embodiment thereof, the invention may provide a test fixture assembly for testing a general aviation directional pilot valve having a housing assembly, an inlet, and an opposing actuating sealing rod assembly. The test fixture assembly provides a base and at least one support mounted to the base to support the housing assembly. Further, the test fixture assembly provides at least one fastener to secure the housing assembly to the support and an adjustable actuator mounted to the base. The actuator sized to engage the sealing rod assembly to longitudinally move the sealing rod assembly and hold it in at least one calibration location.

In yet another embodiment, the invention may provide a method of testing a general aviation directional pilot valve having a housing assembly, an inlet, and an opposing actuating seating rod assembly using a test fixture. The test fixture provides a base, a support, and an adjustable actuator. The method of testing involves attaching the directional pilot valve housing assembly to the test fixture and applying an initial load force to the sealing rod assembly to move it to an initial position to initialize the sealing rod assembly. The actuator is then adjusted to hold the sealing rod assembly in the initial position. Air pressure is supplied to the directional pilot valve inlet and a measurement taken of the air flow through the directional pilot valve with the sealing rod at the initial position. The actuator is then adjusted to move the sealing rod to a second position and measuring the air flow through the directional pilot valve with the sealing rod at the second position is taken.

These and other objects, features and advantages of the preferred apparatus and method will become apparent from the following detailed description, taken in conjunction with the accompanying drawings which illustrate, by way of example the principles of the invention.

DETAILED DESCRIPTION

Before proceeding with the detailed description, it is to be appreciated that the present invention is not limited to use or application with a specific type of directional pilot valve (DPV). Thus, although the present invention is, for the convenience of explanation, depicted and described with respect to one type of a DPV as may be used in connection with a turbine engine thrust reverser, this invention may be applied to other types and styles of DPVs used in other turbine engine applications.

Figure 1A:
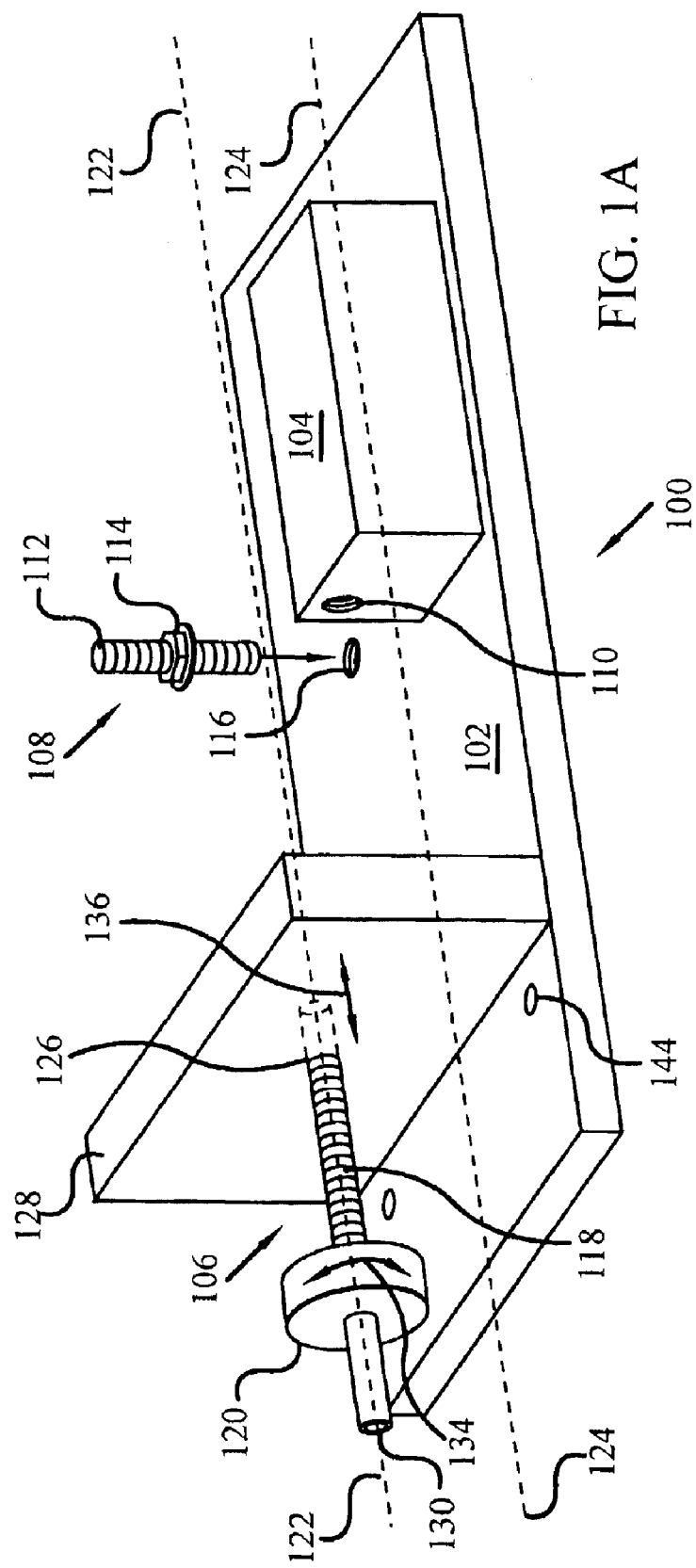
FIG. 1A is a perspective view of the directional pilot valve test fixture according to the present invention.

Turning now to the description and with reference to FIG. 1A, a DPV test fixture 100 is shown as one embodiment of the invention. The test fixture 100 has a base 102, a support 104, an adjustable actuator 106, and an aligner 108. The support 104 further provides threaded screw sockets 110 which serve to attach and secure the housing of a DPV to the test support at substantially the proper elevation for alignment with the adjustable actuator 106.

In at least one embodiment, the adjustable actuator 106 may be a threaded rod 118 mounted to a grip 120. As shown, the longitudinal axis 122 of threaded rod 118 is substantially parallel to the longitudinal axis 124 of the base 102. Threaded rod 118 passes through mated threaded hole 126 in plate 128. As shown, plate 128 is substantially perpendicular and transverse to base 102. Threaded rod 118 may also be hollow with openings 130 and 132 at either end (see FIGS. 1A and 1B), such that a shaft or other tooling implement may be passed through threaded rod 118.

Grip 120 may be sized and shaped to be easily grasped and rotated by a technician. More specifically, as grip 120 is rotated by a technician, the rotation of grip 120 is directly imparted to threaded rod 118. It is to be understood and appreciated that rotation, represented by arrows 134, of grip 120 imparts lateral motion, represented by arrows 136, to threaded rod 118 towards or away from support 104.

In at least one embodiment, threaded rod 118 and grip 120 may be fabricated from a unitary block of metal. Under appropriate circumstances, other methods of coupling may be employed such as glue, welding, press fitting, threaded fitting, or set screws.

The threads of rod 118 and the threads of mated threaded hole 126 may be sufficiently fine and snug to each other such that threaded rod 118 will remain at a fixed position when the technician ceases rotation of grip 120. In addition, in at least one embodiment, force along the longitudinal axis 122 of threaded rod 118 does not impart a rotation of rod 118 through the threads of hole 126. More specifically, rod 118 may support a load force without spontaneous rotation. In at least one embodiment, the threads of rod 118 and hole 126 are substantially about ½"–13 thread.

Figure 1B:
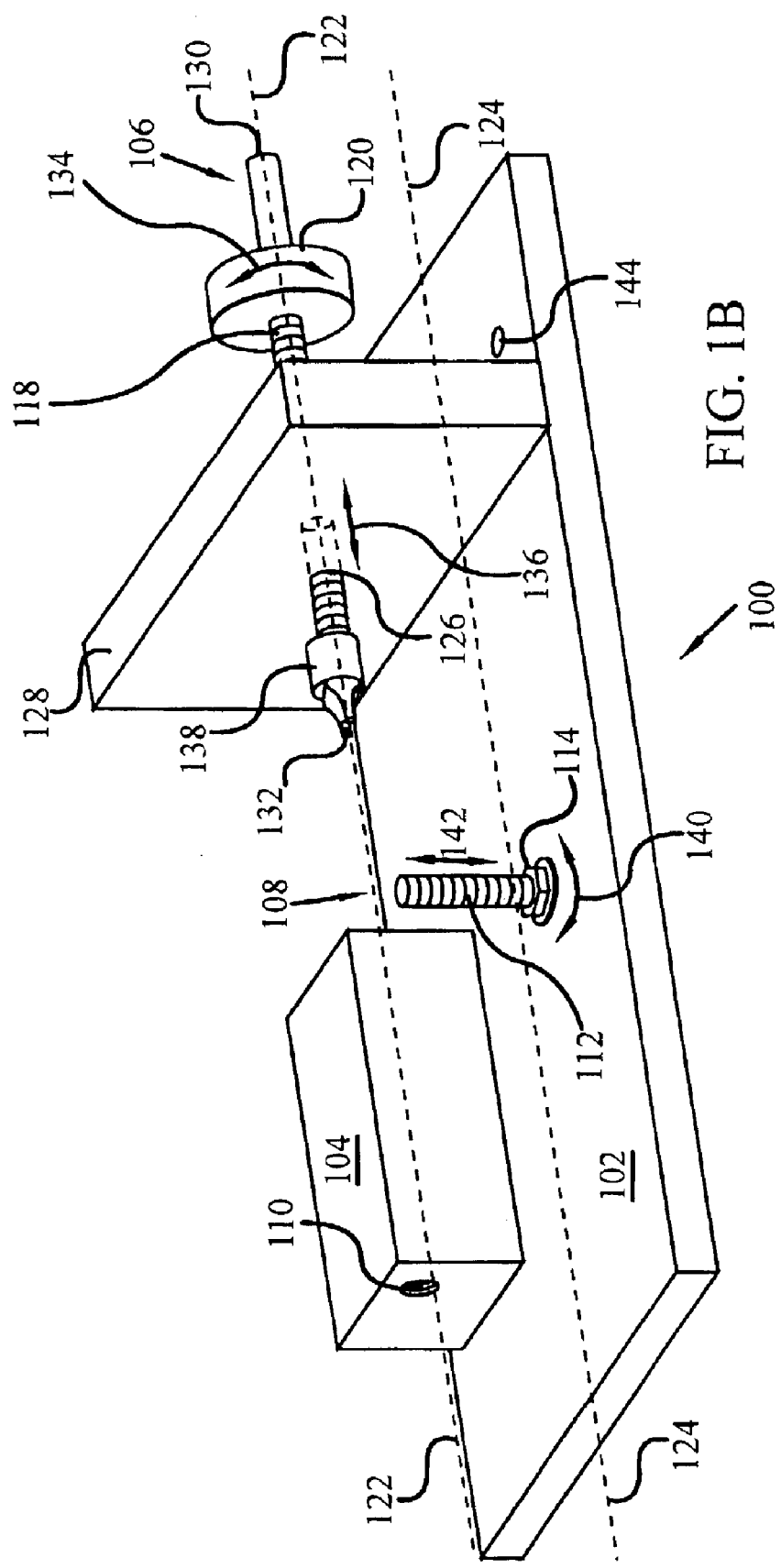
FIG. 1B is a perspective view of the directional pilot valve test fixture of FIG. 1.

Under appropriate circumstances threaded rod 118 may directly contact the distal end of a DPV undergoing testing. However, as shown in FIG. 1B, use of adapter 138 may be employed to improve alignment with, and application of force to, the DPV undergoing testing.

In at least one embodiment, adapter 138 is substantially sized to receive the distal end a DPV undergoing testing, see FIGS. 2 through 3. In addition, adapter 138 may incorporate a swivel bearing such that it is free to rotate about longitudinal axis 122. More specifically, adapter 138 may remain aligned in a specific orientation independent of the rotation of threaded rod 118. Use of a swiveling adapter 138 may help insure that the force applied to the DPV during testing is free of rotational torsion force born by the rotation of threaded rod 118. Under appropriate circumstances, the technician may have a selection of adapters to accommodate different DPVs.

Fine alignment adjustment of the DPV to the actuator, if required, may be achieved with the use of aligner 108. More specifically, in at least one embodiment aligner 108 is a threaded rod 112 extending perpendicularly from a mated threaded socket 116 in base 102, see FIG. 1A. Rotation of threaded rod 112, represented by arrows 140 will raise or lower rod 112, as represented by arrows 142, relative to base 102. A lock-nut 114 may be employed to further secure threaded rod 112 at a desired height. Under appropriate circumstances, other means of height adjustment may be employed.

As shown, support 104 is a solid block with threaded screw sockets 110. In at lest one embodiment, the coupling of support 104 to base 102 is accomplished with bolts installed from the underside of base 102. In addition, the coupling of plate 128 to base 102 is accomplished with bolts installed from the underside of base 102. Under appropriate circumstances, alternative coupling or joining means, such as welding, may be employed. In addition, support 104 may be composed of independent members, and or adjustable in its location upon base 102 so as to accommodate aviation DPVs of different sizes. Further, under appropriate circumstances, a portion of base 102 may be formed, such as by bending, to rise at substantially a right angle to the remaining portion of base 102. Such formed portion may be drilled and threaded with hole 126 so as to substantially assume the role of plate 128.

In at least one embodiment, test fixture 100 may provide securing holes 144 permitting test fixture 100 to be secured to a work surface by pins, screws, bolts, or other similar device.

Having described the above physical embodiment of a DPV test fixture 100, another embodiment relating to the method of employing test fixture 100 to test an aviation DPV will now be described with reference to FIGS. 2A, 2B, 3A and 3B. It will be appreciated that the described method need not be performed in the order in which it is herein described, but that this description is merely exemplary of one method of using the test fixture 100 in accordance with the present invention.

During routine aircraft maintenance, a thrust reverser DPV 281 may be made available for calibration testing. A typical thrust reverser DPV 281 is understood and appreciated to have a housing assembly 283, an inlet 285 and opposite thereto an actuating sealing rod assembly 287.

In general, technician may commence the calibration testing procedure by attaching the DPV 281 to test fixture 100. More specifically, housing assembly 283 is attached to support 104. If elevational alignment adjustment of DPV 281 is required, the technician may adjust aligner 108. Typically, the DPV's employed with turbine engine thrust reversers are substantially standardized. In light of such standardization, after an initial setting, aligner 108 may not require further adjustment in repeated testing applications.

Figure 2A:
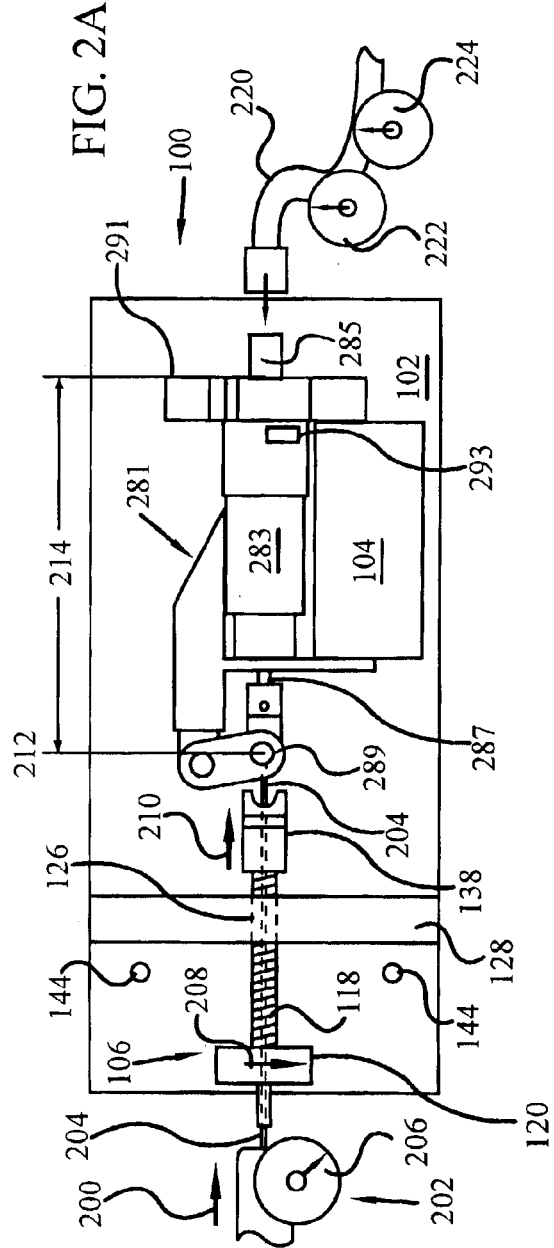
FIG. 2A is a plan view of the directional pilot valve being initialized on the test fixture of FIG. 1.
Figure 2B:
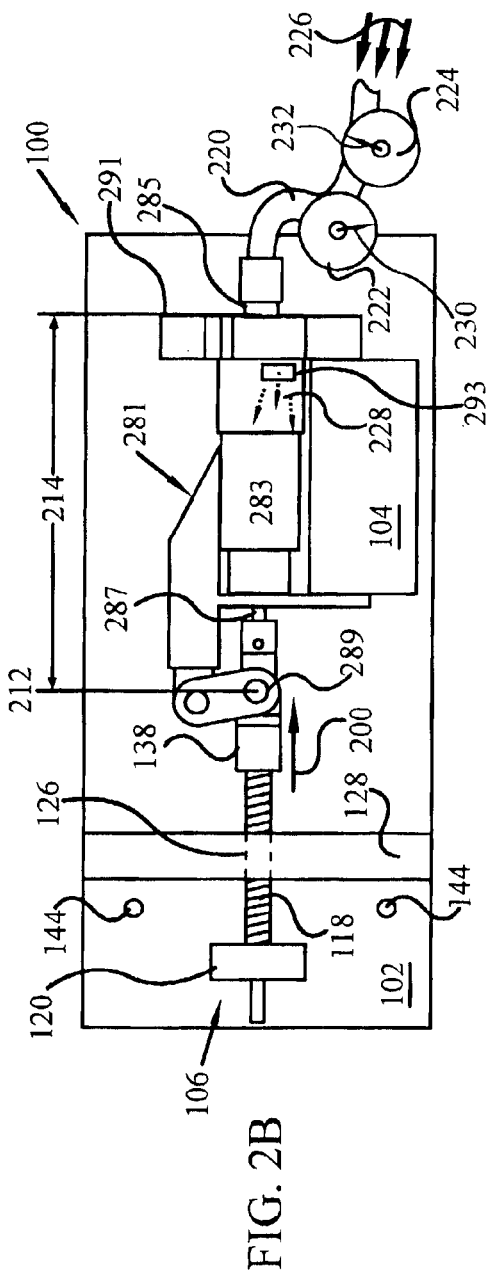
FIG. 2B is a plan view of the initialized pilot valve on the test fixture of FIG. 1 being tested in the initial position.

As shown in FIG. 2A, the technician applies an initial load force, represented by arrow 200, to the sealing rod assembly 287. In at least one embodiment, the initial load force 200 is applied with the use of a force gage 202. Force gage 202 is understood and appreciated to have a force applying shaft 204 and a force indicator, such as dial indicator 206. More specifically, force gage 202 may be a Chatillon force gage, commonly known and available in the industry. The technician may determine the appropriate initial load force by referencing the design specifications for DPV 281.

To apply the initial load force 200, the technician may slide force shaft 204 through threaded rod 118 such that force shaft contacts the distal end 289 of sealing rod assembly 287. The application of initial load force 200 seats sealing rod assembly 287. More specifically, the initial load force 200 initializes DPV 281 to a closed position in accordance with initial design specifications. The technician may observe the precise initial load force 200 applied by viewing dial indicator 206. In at least one embodiment, the initial load force 200 may be substantially about 20.0 pounds per square inch. In at least one embodiment, the initial load force 200 may be substantially about 30.0 pounds per square inch.

Under appropriate circumstances, the technician may observe the force required to initiate actuation of the sealing rod assembly 287 toward the seated position. In at least one embodiment, the measured force to initiate actuation is between about 3.0 to 5.0 pounds per square inch.

With a specific initial load force 200 applied and maintained, as reported by dial indicator 206, the technician may rotate grip 120 as represented by arrow 208. Such rotation is understood and appreciated to drive threaded rod 118 and adapter 138 towards the distal end 289 of sealing rod assembly 287, represented by arrow 210. The technician continues adjusting actuator 106 until adapter 138 engages the distal end 289 of sealing rod assembly 287, and holds it at the initialized position 212. As the sealing rod assembly 287 is held by actuator 106, the force gage 202 may be removed.

An initial dimension measurement 214 may be taken from the base 291 of DPV 281 to initial position 212, and compared to design specifications. In at least one embodiment, the desired initial dimension measurement 214 may be substantially about 4.144 to 4.150 inch. In at least one embodiment, the desired initial measurement 214 may be substantially about 4.744 to 4.750 inch. Should initial dimension measurement 214 of DPV 281 fall outside of the design specification, the technician may note DPV 281 as having failed. Failed valves may be rebuilt and/or reworked as may be deemed appropriate.

An air supply hose 220 with pressure gage 222 and flow gage 224 is connected to air inlet 285. Under appropriate circumstances the pressure and flow rate gages may be a combined unit or apparatus. More specifically, the technician may employ the use of an industry standard air flow measuring system, such as the Daniel's Flow Measuring System.

With respect to FIG. 2A, to perform a leakage calibration test, the technician supplies pressurized air, represented by arrows 226, through supply hose 220 to the initialized DPV 281. A substantially precise reading of the air pressure supplied may be to displayed as pressure 230 by pressure gage 222. In at least one embodiment, the air pressure supplied to inlet 285 is about 49 to 51 pounds per square inch.

As the initial force load applied by the technician is maintained by actuator 106 as adjusted in FIG. 2A, the technician need not be concerned with maintaining the initial load force as the pressurized air 226 is applied. More specifically, as test fixture 100 holds DPV 281 in a substantially fixed position relative to actuator 106, the addition of air pressure does not substantially affect the initial position 212. In addition, the initial load force 200 applied by the technician is understood to remain unchanged with the force of air pressure through DPV 281 being directly additive. As such, the present invention eliminates the possibility of the technician unintentionally increasing or decreasing the initial load force as may be experienced in the prior art system of hand held testing.

Air flow through DPV 281, commonly known as leakage, represented by dotted arrows 228 may occur from vent 293. A substantially precise reading of the air flow rate of leakage 228 may be displayed as flow rate 232 by flow gage 224. In at least one embodiment, the air flow rate of leakage 228 is less than about 0.036 pounds per minute. Should the air flow rate of leakage 228 exceed design specifications, the technician may note DPV 281 as having failed.

Figure 3A:
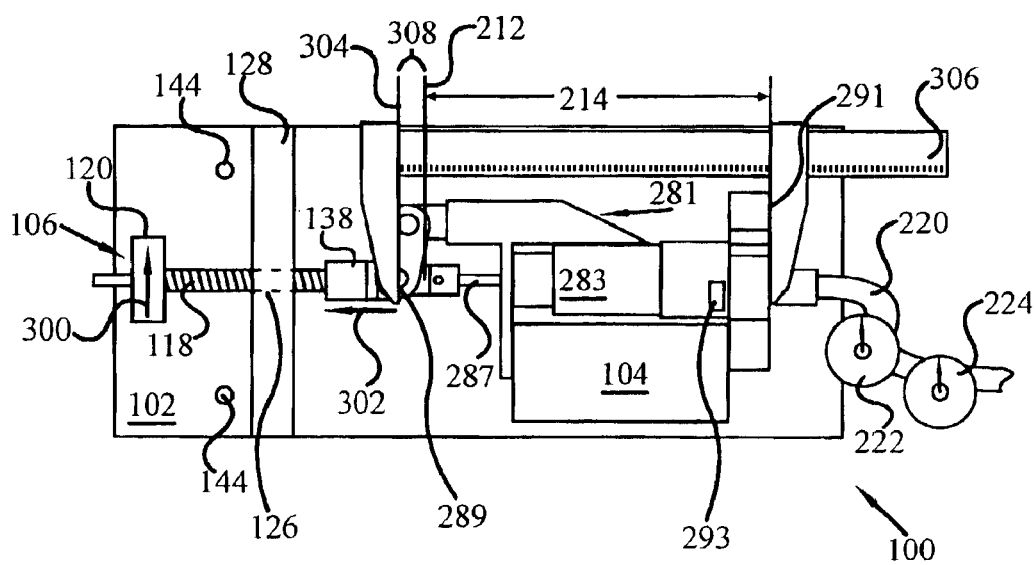
FIG. 3A is a plan view of the directional pilot valve being adjusted on the test fixture of FIG. 1 to permit further testing.
Figure 3B:
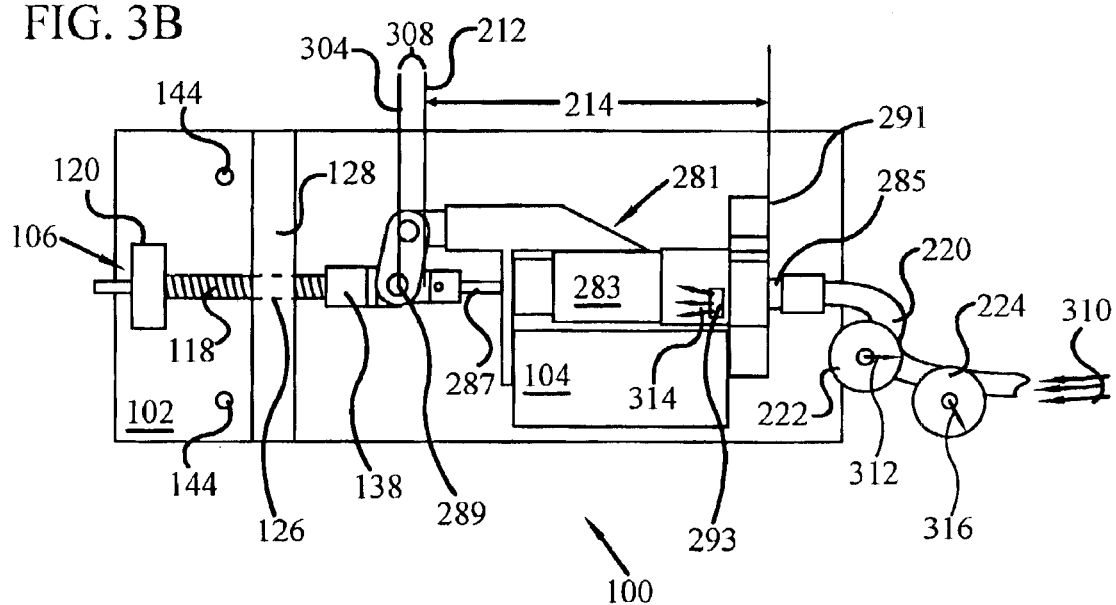
FIG. 3B is a plan view of the directional pilot valve being tested in a second position on the test fixture of FIG. 1.

Testing of the stroke and flow rate of DPV 281, may best be appreciated with respect to FIGS. 3A and 3B. The technician adjusts actuator 106 to open DPV 281. More specifically, the technician may rotate grip 120, represented by arrow 300. Such rotation is understood and appreciated to drive threaded rod 118 and adapter 138 away from support 104, represented by lateral motion arrow 302. In at least one embodiment the lateral motion 302 away from support 104 actuates the sealing rod assembly 287 away from the initial seated position. Under appropriate circumstances, air pressure within DPV 281 may provide an assisting force in actuating the sealing rod assembly 287 as adapter 138 recedes.

The technician adjusts actuator 106 to stroke sealing rod assembly 287 to a second position 304. The technician may use measurement tool 306 to be substantially precise in determining when the distal end 289 of sealing rod assembly 287 has been adjusted second position 304, as measured from the base 291 of DPV 281. The second position 304 may determined by manufacturing specifications.

In at least one embodiment, the difference 308 between the initial position 212 and second position 304 is between about 0.34 to 0.38 inch. If DPV 281 can not be actuated to the second position, the technician may note DPV as failing the stroke test.

To perform the flow test, the technician may adjust the air pressure provided to inlet 285 to a second air pressure, represented by arrows 310, and reported as pressure 312 on pressure gage 222 (see FIG. 3B). In at least one embodiment, the second air pressure may be substantially about 19 to 21 pounds per square inch as reported by pressure gage 222.

Air flow through DPV 281, represented by arrows 314 may occur from vent 293. As described above, test fixture 100 substantially maintains the position of DPV 281 relative to actuator 106, without substantial regard to the presence or absence of air pressure within DPV 281. A substantially precise reading of the air flow 314 may be displayed as flow rate 316 by flow gage 224. In at least one embodiment, the flow rate 316 is at least 2.6 pounds pre minute. Should the air flow rate 316 not meet or exceed design specifications for minimum flow rate, the technician may note DPV 281 as having failed.

As test fixture 100 provides a technician with the ability to specifically identify a failing DPV 281, refurbishment of failing DPV 281 may be appropriately considered and evaluated against the cost of manufacturing a new valve. In addition, test fixture 100 provides a technician with the ability to insure that new a DPV 281 is indeed fabricated to proper design specifications, and correct manufacturing errors prior to installation in turbine engine thrust reversers. It should be appreciated that the valves and dimensions described above will vary according to the particular DPV tested in test fixture 100.

The adjustable features of the test fixture 100 may permit the testing of different DPV's without requiring separate and distinct test fixtures. Such adjustability to accommodate different DPV's is desirable for it improves technician speed and efficiency when testing different DPV's as retrieval of an additional test fixture from inventory is unnecessary. In addition, the adjustability to accommodate other DPV's reduces the volume of specialized test fixtures which might be held in inventory and reduces costs incurred in obtaining and/or manufacturing multiple specialized test fixtures, While the invention has been described with reference to the preferred embodiment, it will be understood by those skilled in the art that various alterations, changes and improvements may be made and equivalents may be substituted for the elements thereof and steps thereof without departing from the scope of the present invention. In addition, many modifications may be made to adapt to a particular situation or material to the teachings of the invention without departing from the essential scope thereof Such alterations, changes, modifications, and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the appended claims.

We claim:

1. A test fixture assembly for testing an aircraft directional pilot valve having a housing assembly, an inlet, and an opposing actuating sealing rod assembly, comprising:

a base;

supporting means for supporting the housing assembly coupled to the base;

attaching means for attaching the housing assembly to the supporting means formed on the supporting means;

actuating means for actuating the sealing rod assembly within the supported housing assembly, the actuating means mounted to the base; and a plate projecting from the base, the plate configured to engage the actuating means.

2. A test fixture assembly for testing an aircraft directional pilot valve having a housing assembly, an inlet, and an opposing actuating sealing rod assembly, comprising:

a base;

at least one support mounted to the base to support the housing assembly;

at least one fastener formed on the support to secure the housing assembly to the support;

an adjustable actuator mounted to the base, the actuator sized to engage the sealing rod assembly to longitudinally move the sealing rod assembly and hold it in at least one calibration location; and a plate projecting from the base, the plate configured to engage the adjustable actuator.

3. The test fixture assembly of claim 2, wherein the adjustable actuator is a threaded rod mounted parallel to the plane of the base; and wherein the the plate has a threaded hole formed therein to engage the threaded rod.

4. The test fixture assembly of claim 3, wherein the threads of threaded rod and mating threaded hole are substantially about ½–13 threads.

5. The test fixture assembly of claim 3, wherein the threaded rod is hollow and has openings at each end.

6. The test fixture assembly of claim 5, further comprising an adapter mounted to the threaded rod proximate to the support, the adapter substantially sized to engage the sealing rod assembly.

7. The test fixture assembly of claim 5, further comprising a grip mounted to the threaded rod.

8. The test fixture assembly of claim 2, further comprising an adjustable aligner mounted to the base.

9. The test fixture assembly of claim 7, wherein the adjustable aligner is a threaded rod perpendicular to the base.

10. The test fixture assembly of claim 2, wherein the at least one fastener is a threaded screw socket.

11. A method of testing an aircraft directional pilot valve having a housing assembly, an inlet, and an opposing actuating sealing rod assembly using a test fixture having a base, a support, and an adjustable actuator, the method comprising:

attaching the directional pilot valve housing assembly to the test fixture;

applying an initial load force to the sealing rod assembly to move it to an initial position to initialize the sealing rod assembly;

adjusting the actuator to hold the sealing rod assembly in the initial position;

supplying air at a first air pressure to the directional pilot valve inlet;

measuring the air flow through the directional pilot valve with the sealing rod assembly at the initial position;

adjusting the actuator to move the sealing rod to a second position; and measuring the air flow through the directional pilot valve with the sealing rod at the second position.

12. The method of claim 11, wherein the initial load force is between about 20 to 30 pounds.

13. The method of claim 11, wherein the initial load force is applied with a force gage slid through the adjustable actuator.

14. The method of claim 11, wherein the air flow through the directional pilot valve with the sealing rod at the initial position is less than about 0.036 pounds per minute.

15. The method of claim 11, wherein the first air pressure supplied to the inlet is between about 49 to 51 pounds per square inch.

16. The method of claim 15, wherein the air flow measured at the initial position is not greater than about 0.036 pounds per minute.

17. The method of claim 11, wherein the second position of the sealing rod is between about 0.34 to 0.38 inch away from the initial seated position.

18. The method of claim 11, further including adjusting the supplied air from a first air pressure to a second air pressure.

19. The method of claim 18, wherein the second air pressure supplied to the inlet is between about 19 to 21 pounds per square inch.

20. The method of claim 19, wherein the air flow measured at the second position is at least 2.6 pounds per minute.

21. The method of claim 11, further comprising measuring the force required to initiate actuation of the sealing rod from an open to a closed position before applying the initial load force.

22. The method of claim 21, wherein the measured force to initiate actuation is between about 3.0 to 5.0 pounds.

23. The method of claim 11, further comprising comparing the measured air flow at the initial position to an acceptable calibration range.

24. The method of claim 11, further comprising comparing the measured air flow at the second position to an acceptable calibration range.

* * * * *